(12) United States Patent
Hino et al.

(10) Patent No.: US 6,480,934 B1
(45) Date of Patent: Nov. 12, 2002

(54) STORAGE CONTROL UNIT AND METHOD FOR HANDLING DATA STORAGE SYSTEM USING THEREOF

(75) Inventors: Naoki Hino, Hiratsuka; Toshiya Nakano, Chigasaki; Tetsuya Kishimoto, Odawara; Hidehiko Iwasaki, Hiratsuka; Kenji Muraoka; Kenichi Takamoto, both of Odawara, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/406,838

(22) Filed: Sep. 28, 1999

(30) Foreign Application Priority Data

Sep. 28, 1998 (JP) .......................................... 10-272883

(51) Int. Cl.[7] .............................................. G06F 12/08
(52) U.S. Cl. ...................................................... 711/114
(58) Field of Search .......................... 711/111, 112, 114

(56) References Cited

U.S. PATENT DOCUMENTS

| 5,587,685 A | * | 12/1996 | Johansson | .................. 327/546 |
| 5,615,352 A | * | 3/1997 | Jacobson et al. | ........... 395/441 |
| 5,822,782 A | * | 10/1998 | Humliceh et al. | .......... 711/170 |
| 5,875,456 A | * | 2/1999 | Stallmo et al. | .............. 711/114 |
| 6,061,752 A | * | 5/2000 | Jones et al. | .................. 710/103 |
| 6,085,332 A | * | 7/2000 | El-Batal | ........................ 714/5 |

* cited by examiner

Primary Examiner—Kevin L. Ellis
(74) Attorney, Agent, or Firm—Antonelli, Terry, Stout & Kraus, LLP

(57) ABSTRACT

For providing a storage control unit to be connected to a fiber channel, in which a new storage control unit is added onto the fiber channel network during on-line operation and succeeds control information of a logical unit from the storage control unit which has been existing before, so as to be in charge of a process request issued to that logical unit from a host computer thereafter, wherein a control memory being able to memorize the control information is provided in each of the storage control units 30 and 40, which information is necessary when succeeding or taking over the logical unit and is represented by such as construction information of a magnetic disk drive within a disk drive unit 20 and construction information of the logical unit, so on. The contents of the control memory within the storage control unit 30 is copied into the control memory of the storage control unit 40 when the new storage control unit 40 is added onto the fiber channel network.

12 Claims, 12 Drawing Sheets

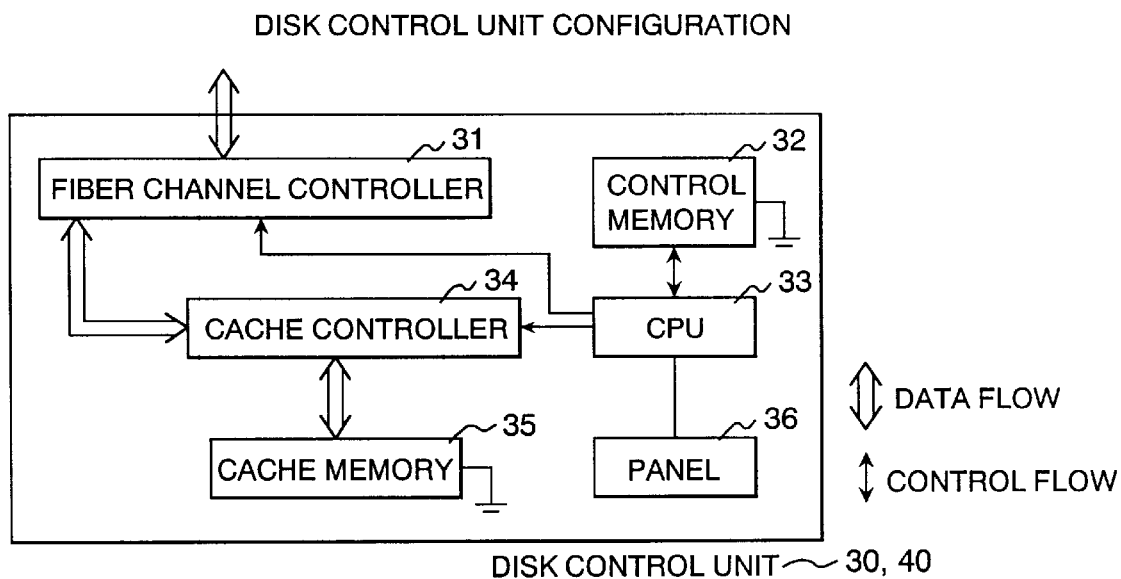
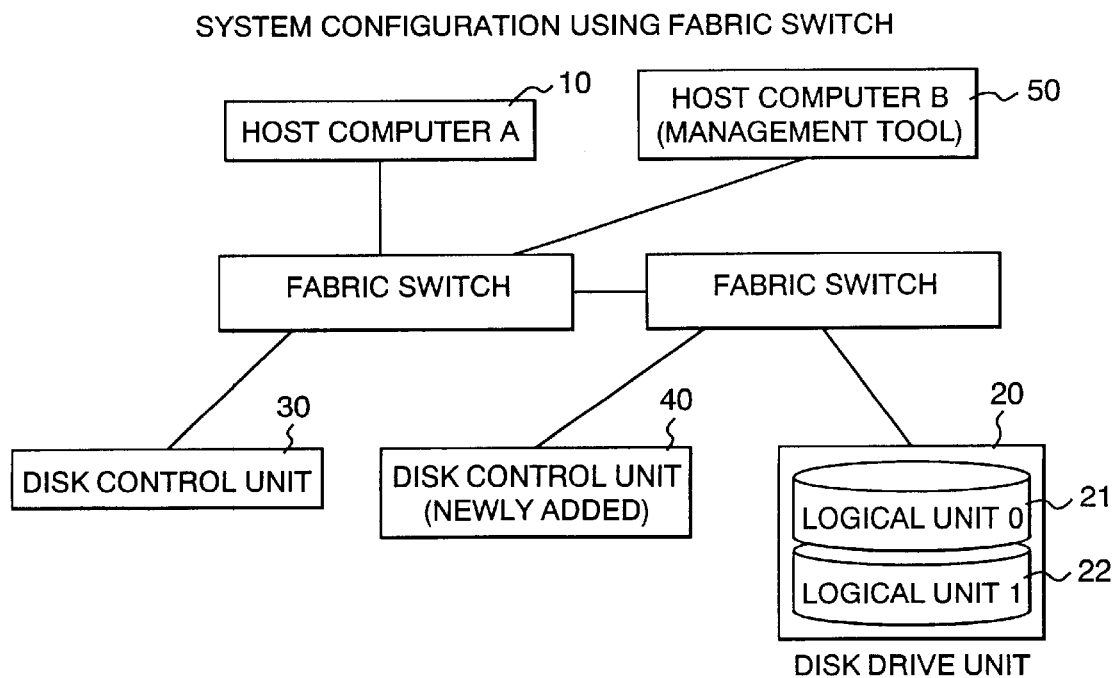

SYSTEM CONFIGURATION USING PLURAL FC-AL LOOPS

FIG. 5

FORMAT OF FRAME

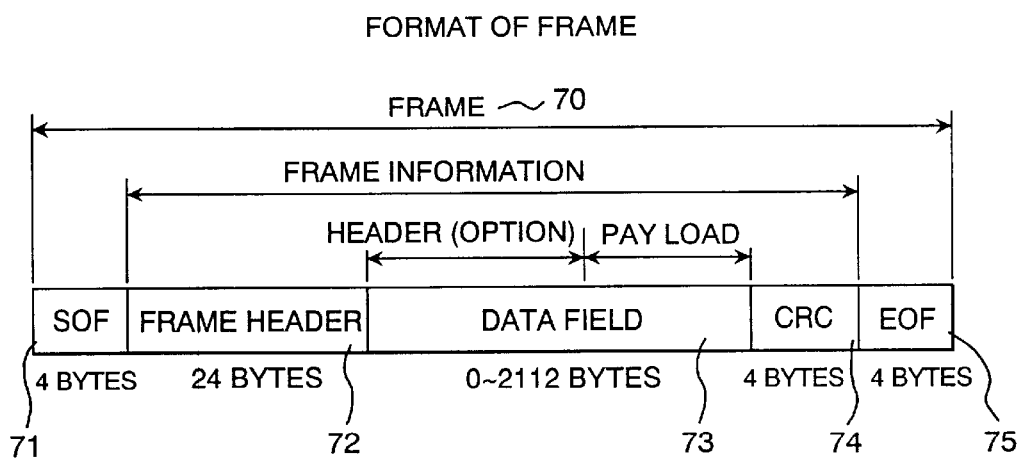

FIG. 6

FORMAT OF FRAME HEADER

| Bit<br>Word | 31-24 | 23-16 | 15-8 | 7-0 |
|---|---|---|---|---|
| 0 | R_CTL | D_ID (N_Port ADDRESS IDENTIFIER AT FRAME RECEIVER SIDE) | | |
| 1 | Reserved | S_ID (N_Port ADDRESS IDENTIFIER AT FRAME SENDER SIDE) | | |
| 2 | TYPE | F_CTL | | |
| 3 | SEQ_ID | DF_CTL | SEQ_CNT | |
| 4 | OX_ID | | RX_ID | |
| 5 | Parameter | | | |

R_CTL : Routing Control,　D_ID : Destination ID
S_ID : Source ID,　TYPE : Data Structure Type
F_CTL : Frame Control,　SEQ_ID : Sequence ID
DF_CTL : Data Field Control,　SEQ_CNT : Sequence Count
OX_ID : Originator Exchange ID
RX_ID : Responder Exchange ID

FIG. 7a

FORMAT OF FCP_CMND PAY LOAD

90

| Bit<br>Word | 31-24 | 23-16 | 15-8 | 7-0 |
|---|---|---|---|---|
| 0-1 | FCP_LUN (ESTABLISH LOGICAL UNIT NUMBER) | | | | 91
| 2 | FCP_CNTL (ESTABLISH COMMAND CONTROL PARAMETER) | | | | 92
| 3-6 | FCP_CDB (STORE CDB OF SCSI) | | | | 93
| 7 | FCP_DL (DESIGNATE DATA AMOUNT TO BE TRANSFERRED BY BYTE NUMBER) | | | | 94

FCP : Fiber Channel Protocol for SCSI,    CMND : Command
LUN : Logical Unit Number,    CNTL : Control
CDB : Command Descriptor Block,    DL : Data Length

FIG. 7b

FORMAT OF FCP_CDB 93

| Bit<br>Byte | 7 | 6 | 5 | 4 | 3 | 2 | 1 | 0 |
|---|---|---|---|---|---|---|---|---|
| 0 | Operation Code | | | | | | | | 95
| 1 | Logical Unit Number | | | Logical Block Address (MSB) | | | | |
| 2 | Logical Block Address | | | | | | | |
| 3 | Logical Block Address (LSB) | | | | | | | |
| 4 | Transfer Length | | | | | | | |
| 5 | Vendor Unique | | | Reserved | | | Flag | Link |

FIG. 8

FORMAT OF FCP_RSP PAY LOAD 100

| Bit / Word | 31-24 | 23-16 | 15-8 | 7-0 |
|---|---|---|---|---|
| 0-1 | Reserved | | | |
| 2 | FCP_STATUS (ESTABLISH INFORMATION OF SCSI STATUS, etc.) | | | |
| 3 | FCP_RESID (ESTABLISH SIZE OF DATA NOT TRANSFERRED) | | | |
| 4 | FCP_SNS_LEN (ESTABLISH EFFECTIVE BYTE NUMBER IN REGION OF FCP_SNS_INFO) | | | |
| 5 | FCP_RSP_LEN (ESTABLISH EFFECTIVE BYTE NUMBER IN REGION OF FCP_RSP_INFO) | | | |
| 6~n | FCP_RSP_INFO (ESTABLISH FCP PROTOCOL ERROR INFORMATION, etc.) | | | |
| n~31 | FCP_SNS_INFO (SCSI SENSE INFORMATION) | | | |

SEQUENCE OF INQUIRY COMMAND

SEQUENCE OF MODE SENSE COMMAND

FIG. 12

PHYSICAL DISK DRIVE CONTROL TABLE 110

| PHYSICAL DISK DRIVE NO. | PHYSICAL DISK DRIVE POSITION | MEMORY CAPACITY | NUMBER OF BLOCK | RAID GROUP NO. | CONDITION | KIND OF MEMORY DIVICE |
|---|---|---|---|---|---|---|
| 0 | | | | | | |
| 1 | | | | | | |
| : | | | | | | |

FIG. 13

LOGICAL UNIT CONTROL TABLE 120

| LOGICAL UNIT NO. | RAID GROUP NO. | RAID LEVEL | HEADER ADDRESS | END ADDRESS |
|---|---|---|---|---|
| 0 | | | | |
| 1 | | | | |
| : | | | | |

OPERATION SEQUENCE OF MANAGEMENT
TOOL INSTALLED IN HOST DEVICE B 50

MANAGEMENT TOOL ADMINISTRATION TABLE 130

SYSTEM CONFIGURATION

STORAGE CONTROL UNIT AND METHOD FOR HANDLING DATA STORAGE SYSTEM USING THEREOF

BACKGROUND OF THE INVENTION

The present invention relates to a storage control unit for controlling storage devices, such as magnetic disk devices, magnetic tape devices, optical disk devices, opt-magnetic disk devices, library devices and so on, so as to manage input/output (accesses) thereof to a host apparatus or device (s) of higher level, and in particular to a controller and a data storage system using thereof, in which fiber channels are used as routes or channels for accessing to such the storage devices.

In more detail, the present invention relates to a computer system, in which fiber channels standardized by ANSI X3T11 are applied as interfaces among the host computer(s), the storage devices such as the magnetic disk devices, and the storage control unit(s), and relates to a data storage system, in which a new storage control unit(s) is added to during an online operation of the computer system, thereby enabling to disperse or decentralize loads between or among the storage control units or to centralize functions which are conducted by plural controllers.

Conventionally, relating to install of an additional storage control unit(s), for example in Japanese Patent Laying-Open No. Hei 7-20994 (1995), there is described an enlargement in scale, especially, in a memory system of a large-scaled computer, by means of additional installations of a connecting adopter to the host computer in the memory system, a connecting adopter to the disk drive device and a shared cache memory, as well as function of inserting and extracting of live wires. And, there is proposed a manner wherein, the connecting adopter to the host computer, the connecting adopter to the disk drive unit and the shared cache memory mentioned above are installed one by one on an interior bus in the memory system.

The technology disclosed in Japanese Patent Laying-Open No. Hei 7-20994 (1995) adopts a shared cache memory method which is used generally in the memory system of the large-scaled computer, wherein each of the adopters connecting to the host computer(s) reads control information in a logical unit(s) located in the shared cache memory on the interior bus, sequentially, therefore it is able to access to a random logical unit without necessity of process of succession (i.e., taking over) or transfer of the control information of the logical unit between the connecting adopters to the host computer(s).

Also, relating multiplexing of the storage control units, each having the cache memory, for example in Japanese Patent Laying-Open No. Hei 7-160432 (1995), there is described a method, wherein the storage control unit is duplicated, while one of the storage control units is in a waiting condition as a standby storage control unit when occurring trouble in the other, thereby achieving redundancy of the storage control unit. Further, in Japanese Patent Laying-Open No. Hei 8-335144 (1996), there are also described the decentralization of loads by duplication of the storage control units and the redundancy of thereof when occurring problem therein.

SUMMARY OF THE INVENTION

In the technology in the above-mentioned Japanese Patent Laying-Open No. Hei 7-20994 (1995), however the control information of the logical unit is stored on the shared cache memory on the interior bus, therefore the enlargement of scale can be carried out only within a case or housing of one memory system.

In the technology in the above-mentioned Japanese Patent Laying-Open No. Hei 7-160432 (1995) or Hei 8-335144 (1996), however there is necessity that, in the storage control unit to be duplicated, each storage control unit must be connected physically in advance when being in a condition of off-line, and setting must be done on the logical unit which the each storage control unit takes in charge of, when operating under normal condition and when problem occurs therein. Further, the control information of the logical units are transferred by using the interior bus, therefore it depends on initial setting, and does not have expandability during the on-line operation.

For achieving expansion of functions with flexibility, it is enough that as the bus or route on which a new storage control unit is added is adopted an interface which is used for connecting with the host computer(s), that each storage control unit to be added further has it's own cache memory, and that the control information of the logical unit (one logical drive or a group of plurality of logical drives) is copied into the above-mentioned cache memory as a logical unit of the storege devices.

According to the present invention, there is established a data storage system, in which a fiber channel standardized by ANSI X3T11 is applied to, for the host device(s), the storege device(s) such as the magnetic disk device and so on, and the storage control unit(s).

And, in said system, a new storage control unit is added onto the fiber channel network during on-line operation, so as to succeed or take over the control information from the existing storage control unit, thereby achieving load distribution between the storage control unit being newly added and the existing storage control unit.

The new storage control unit has a means of a function for obtaining (i.e., succeeding) the control information by a unit of the logical unit from the existing storage control unit on the fiber channel network through the fiber channel network, when being added to the existing fiber channel network during the on-line operation of the computer system. Upon completion of the obtaining or succeeding of the control information, it serves under the storage control unit, into which a predetermined logical unit is added.

The storage control unit being newly added to processes a command process request if it is issued from the host computer, for the logical unit which serves under the control of it. In this manner, the storage control unit being newly added to and the existing storage control unit share or distribute the load between them.

The load distribution according to the present invention can be applied even if a plurality of the existing storage control units on the fiber channel network have no means nor function of performing the load distribution and integration during the on-line operation. However, when putting the present invention into the embodiment, there is necessity to establish a function for conducting the succession of the control information.

Further, when succeeding or taking over the control information by the unit of logical unit, an operator establishes a means or a function of designating start for the succession of logical unit and the operation mode thereof during the operation of succession on the host computer or the storage control unit, by using management tool being operative on the host computer which is connected to a network, such as the fiber channel network, the LAN (Local Area Network) and so on, or by using a panel of the storage control unit, thereby enabling to perform the addition of the new storage control unit at an appropriate timing.

Further, in more details, the storage control unit which is newly connected to the fiber channel network has the means or function of succeeding the information for the purpose of identifying the storage control unit uniquely from the host computer, i.e., N_Port address, from the existing storage control unit which is connected to the fiber channel network and owns the logical unit to be succeeded, when performing the succession of the control information by the unit of the logical unit. Thereby, it is not necessary to change or alter the route of the command process request which is issued from the host computer.

The storage control unit according to the present invention has a control memory, and it has the means or function of memorizing the control information on said control memory, which is necessary for the succession of the logical unit and can be represented by, such as a physical drive control table, into which are stored the kinds of the magnetic disk device or the others, the memory capacities of the storage devices, the number of blocks, the condition of each storage device, the constructive information of RAID (Redundant Arrays of Inexpensive Disks), etc., and a logical unit control table, into which are stored header LBA (Logical Block Address) and last LBA of the logical unit.

And, the storage control unit which is newly added onto the same fiber channel network has a means or function of copying the above-mentioned control information, from the control memory on the storage control unit which has already been existing before on the above-mentioned fiber channel network to the control memory of the storage control unit which is newly added.

The above-mentioned control memory on the storage control unit may be of a volatile one, however is of a non-volatile memory, in general. Also, by writing the contents (i.e., established information on the control table or the others) into the storage device, such as the magnetic disk device or the others which is connected to the fiber channel network, it is possible to obtain the same effect as obtained when the control memory is made of the non-volatile memory. Namely, when occurring abrupt interruption in the electric power source, the storage control unit can maintain the established information permanently, until when performing the reset of that established information, for example.

Also, by using the succession of the control information by the unit of logical unit during the on-line operation, according to the present invention, it is also possible to integrate or gather several processes which are conducted by the plural storage control units into an arbitrary storage control unit.

In a method for adding a new storage control unit, (1) after connecting the new storage control unit to the fiber channel network physically, (2) a link set is issued from that storage control unit side to the fiber channel network, so as to perform logical log-in into the fiber channel network. (3) Thereafter, the operator conducts acknowledgment of the storage control unit(s) from the management tool on the host computer which is connected to the fiber channel network, or from a panel of the storage control unit, (4) setting or establishing a designation of the logical unit of which the storage control unit being newly added is in charge, an instruction of start of the succession of logical unit, and a manner of response when the process request is issued from the host computer to the storage control unit which has already been existing on the fiber channel network before, during the succession of that logical unit, and (5) the transfer of the control information of logical unit from the storage control unit which has already been existing on the fiber channel network before to the storage control unit which is newly added. (6) Further, in the storage control unit which has already been existing on that fiber channel network before, a plurality of the N_Port addresses, i.e., the information for identifying the storage control units uniquely from the host computer, are established, (7) and the storage control unit which is newly added to the fiber channel network succeeds or takes over a portion of the above-mentioned N_Port addresses, thereby rendering the change or alter of the route for the command process request unnecessary. (8) Further, the storage control unit, existing on the fiber channel network during the on-time operation of the computer system, succeeds or takes over the control information by a unit of the logical unit from the other storage control unit which is connected to the same fiber channel network, (9) so as to be in charge of the command process request being issued from the host device to that succeeding logical unit thereafter, (10) thereby achieving the load distribution between or among the storage control units existing on the fiber channel network. (11) Depending upon necessity, the integration of processes which are performed by the plurality of storage control units into an arbitrary storage control unit is performed by applying the technology of succeeding the control information of the logical unit during the on-line operation therein.

BRIEF DESCRIPTION OF THE DRAWINGS

FIG. 2 is a view of internal hardware structure of a disk control unit according to the embodiment;

FIG. 3 is a view of the hardware structure where Fabric topology is applied into a fiber channel network;

FIG. 5 is a view for showing a format of a frame as a basic unit, with which data is transferred on the fiber channels in the present embodiment;

FIG. 6 is a view for showing a format of a frame header which constructs the frame shown in FIG. 5;

FIGS. 7(a) and (b) are views for showing a format of a pay load of FCP_CMND as a constructive element of the frame shown in FIG. 5, and a format of FCP_CDB constituting that pay load, respectively;

FIG. 8 is a view for showing a format of the pay load of FCP_RSP as the constructive element of the frame shown in FIG. 5;

FIG. 12 is a view for showing a format of a physical disk drive control table which is stored in a control memory within the disk control unit in the present embodiment;

FIG. 13 is a view for showing a format of a logical unit control table which is stored in the control memory within the disk control unit in the present embodiment;

DETAILED DESCRIPTION OF PREFERRED EMBODIMENT

Hereinafter, embodiments according to the present invention will be fully explained by referring to the attached drawings. Here will be given explanation only on an embodiment in which a magnetic disk device (hereinafter, described by a disk drive unit) is applied, however into it also an optical disk device and a tape memory device, etc., can be applied, in place thereof. And, since the disk drive unit is used in the present embodiment, therefore the storage control unit comes to be the disk control unit hereinafter.

Figure 1:
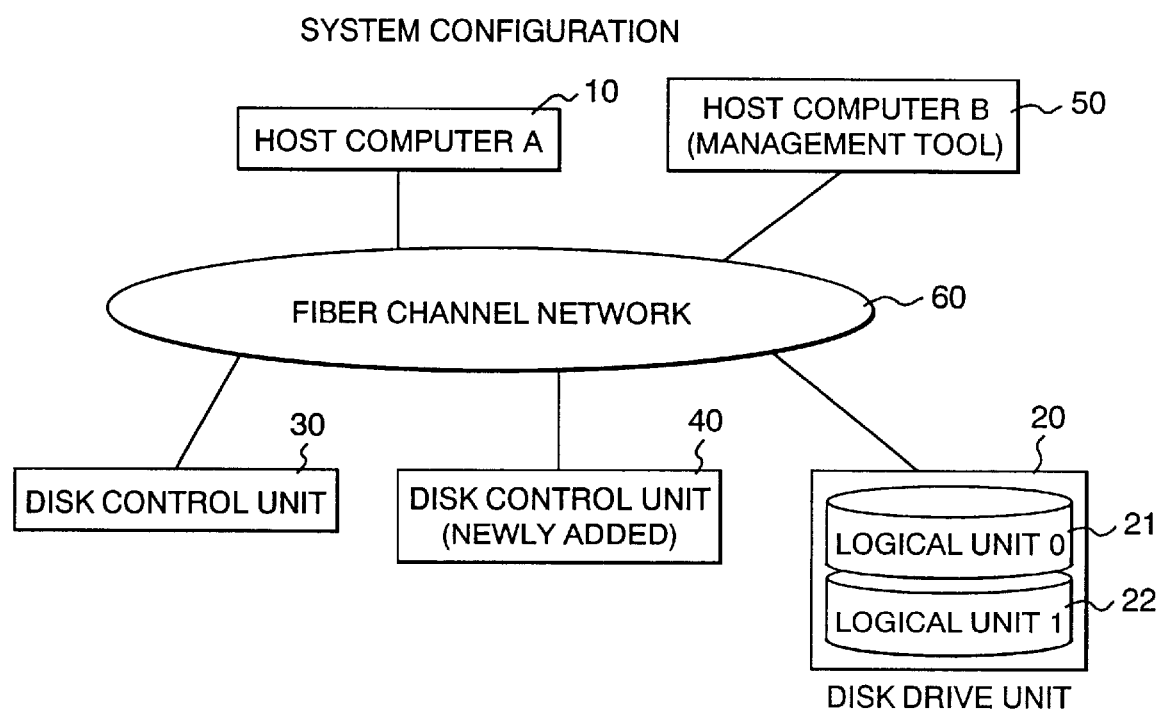
FIG. 1 is a view of the hardware structure for showing an embodiment according to the present invention.

FIG. 1 shows the hardware structure of an embodiment according to the present invention, in particular, in a case where a connection mode (topology) of FC-AL (Fiber Channel Arbitrated Loop) is applied into a fiber channel network.

In FIG. 1, a reference numeral 10 is a host computer having a central processing unit (CPU) for data processing. A reference numeral 60 is a fiber channel network, being connected to various devices through FC-AL hubs and operating according to the FC-AL topology.

A reference numeral 20 is a disk drive unit, into which data from the host computer A (10) are stored, and it is constructed with a plurality of magnetic disk drives. By dividing the plurality of the disk drive devices constituting the disk drive unit 20 logically and defining the divisions into areas arbitrary RAID levels, redundancy can be achieved when trouble occurs in the disk drive unit, thereby enabling to protect from loosing of data when the trouble occurs in the disk drive unit. This division is called by RAID group. An area of an access unit of SCSI (Small Computer System Interface) which is further divided logically from the RAID group, is called by a logical unit. This area has a number called by LUN (Logical Unit Number).

In the present embodiment, the disk drive unit 20 has a logical unit 0 (21) and a logical unit 1 (22), however the number of the logical units must not to be only two (2) as shown in FIG. 1 (i.e., with the fiber channels in conformity with the SCSI-3 standard, at the most 64 logical units can be divided for each fiber channel ID. Also, in FIG. 1 is shown the example of the case where the number of the disk drive unit is one (1), however it does not matter even if the disk drive unit may be provided on the fiber channel network in plural thereof. In a data storage system of large capacity being constructed with the plurality of disk drive units, a disk control unit very often falls into a condition of shortage in processing capacity thereof, and the present invention is very effective when the disk control unit of the computer system falls in such the shortage in the processing capacity thereof.

Also, in the view of the internal structure of the disk control units 30 and 40 shown in FIG. 2, a reference numeral 31 is a fiber channel controller which controls data transfer on the fiber channel network and further analyzes commands sent from the host computer 10, so as to perform DMA (Direct Memory Access) transfer of the data to a cache controller 34. A reference numeral 32 is a non-volatile control memory for storing control information which is necessary when succeeding or taking over micro-programs and the logical units for controlling the operation of the disk control unit(s). A reference numeral 33 is a central processing unit (CPU) for controlling the disk controllers as a whole. A reference numeral 34 is a cache control unit for controlling read and write (i.e., input and output) of data into a cache memory, and a reference numeral 35 is a cache memory into which data to be written into and read out from the disk drive unit 20 is stored contemporarily. A reference numeral 36 is a panel for changing or referring operation settings of the disk control unit(s).

A reference numeral 50 is a host computer having a management tool for controlling the operations of the disk control units 30 and 40. In the present embodiment, the host computer B (50) has the management tool, but it does not matter that the host computer A (10) may have the management tool. Further, the interface between the host computer B (50) installing the management tool and the disk control unit 30 or 40 may be a network system, such as a LAN, through which remote control can be achieved.

Next, explanation will be given on flow of control and flow of data in a case where the host computer A (10) performs data transfer through the disk control unit 30 with the disk drive unit 20, by taking as one example.

When the host computer A (10) sends an access request, the fiber channel controller 31, which acknowledges this request, issues an interruption request to the CPU 33. The CPU 33 analyzes a command from the host device A (10), and then reads out information from a physical disk drive control table, which stores the memory capacities and the number of blocks of the magnetic disk drives within the control memory 32, condition of each of the magnetic disk drives and information of the RAID structure, and information from a logical unit control table which stores top LBA (Logical Block Address) and last LBA therein.

In a case where the access request from the host computer A (10) is a write command, the CPU 33 issues an instruction of data transfer to the fiber channel controller 31, and then the write data transferred from the host computer A (10) is stored into the cache memory 35 through the cache controller 34, while the fiber channel controller 31 makes a report of completion in writing to the host computer A (10). After reporting of the completion in writing, the CPU 33 controls the fiber channel controller 31 so as to write the above-mentioned write data and redundant data into the logical units 21 and 22 of the disk drive unit through the fiber channel network.

In this instance, if the RAID level of the logical units storing the write data is RAID 5, upon the disk control unit 30 and the disk drive unit 20 are needed processes of very high load, such as, processing of reading out of old data and old redundancy data for executing the storing of write data, processing of generating new redundancy data, and processing of storing of the above-mentioned write data and the new redundancy data. This is called by a Write penalty process.

In this Write penalty process, though the fact that a large number of accesses to the disk drive unit 20 are generated can be one of a reasons, further than that, due to the fact that much amount of time is needed for execution of the microprogram of the disk control unit 30, which controls the disk drive unit 20, therefore the CPU 33 of the disk control unit 30 often falls into a condition of shortage of capacity in processing thereof. According to the resent invention, with provision of an additional disk control unit 40 during the on-line operation, there can be obtained an effect that the shortage of capacity in processing by the disk control unit 30 is dissolved.

On the other hand, in a case where the access request from the host computer A (10) is a read command, the CPU 33 issues an instruction to the fiber channel controller 31, so as to read out data by accessing to the logical units 21 and 22 within the disk drive computer 20, into which the data blocks required by that access requirement are stored, and it stores the read data through the cache controller 34 into the cache memory 35. After storing the read data into the cache memory 35, the CPU 33 issues instruction to the fiber channel controller 31, so as to transfer the read data stored into the cache memory 35 to the host device A (10), and after the completion of the data transfer, it gives a report of completion in the reading onto the host computer A (10).

Next, explanation will be given on features of the fiber channel network 60. The fiber channel network is a long distance and high speed interface, with which is achieved data transfer at distance of 10 km at the maximum and at data transfer speed of 100 MB/s at the maximum. Also, the fiber channel has a function of conducting mapping of various protocols, such as SCSI, IP, IPI, etc., being located in a higher logical layer (or higher hierarchy), down to the fiber channel protocols of a lower logical layer (or lower hierarchy), therefore it is possible for the host computer A (10) to perform the data transfer by connecting the devices having different protocols, such as the SCSI and IP, etc., to the same fiber channel network. Namely, it has logical compatibility with other interfaces.

In the fiber channel, there are defined three connection modes (topologies). First one is a point to point topology, in which the host device is connected to the device one by one. Second one is a FC-AL topology, in which a plurality of the host computers are connected to the devices with forming a one loop. The FC-AL connection is established by means of a device being called by a FC-AL hub. Third one is a fabric topology, in which the host computer and the devices are disposed in a star-like connection through the device being called by a Fabric switch.

Figure 4:
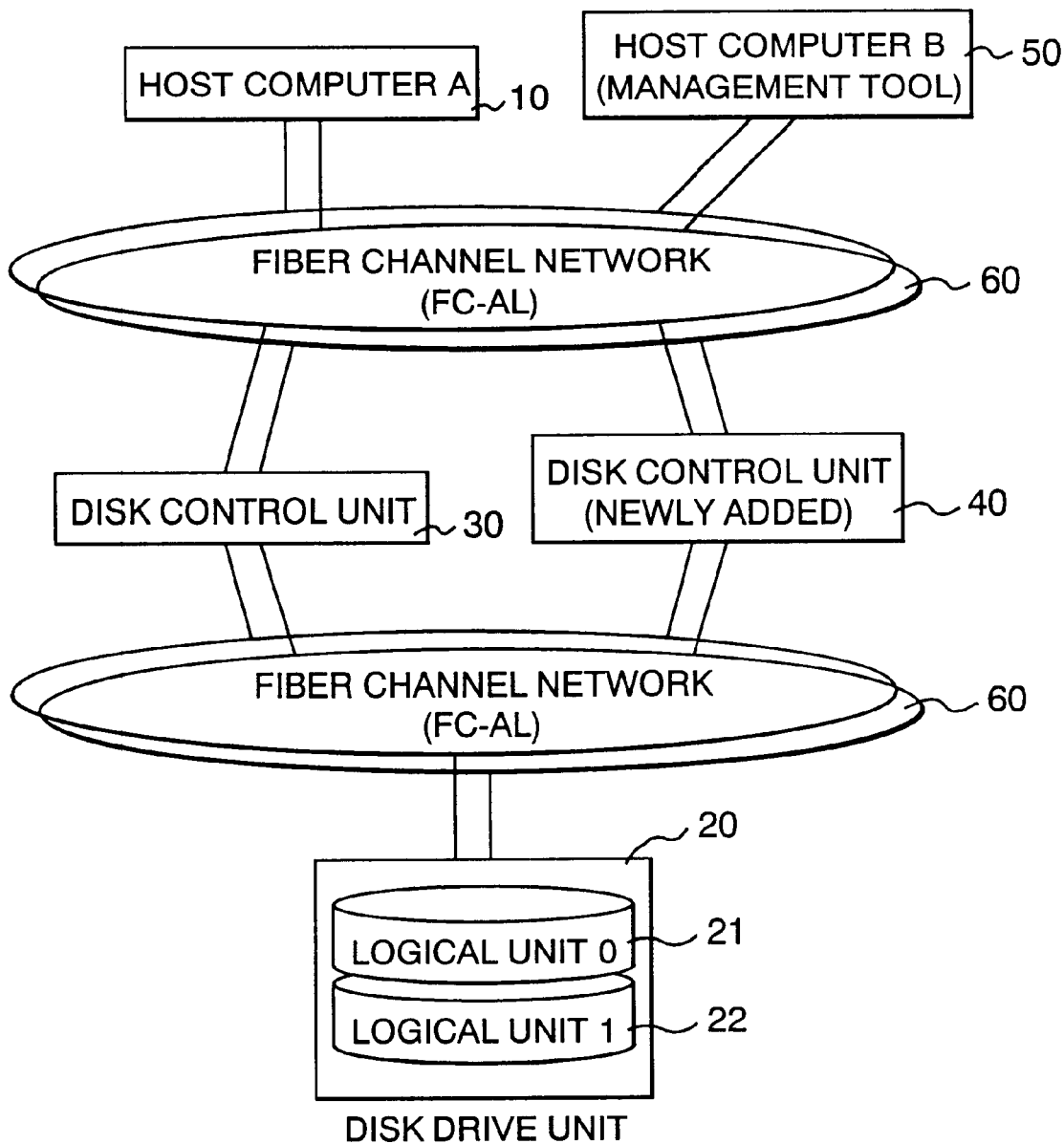
FIG. 4 is a view of the hardware structure where a plurality of FC-AL loops are applied into the fiber channel network.

In the present embodiment shown in FIG. 1, as the fiber channel network is applied the FC-AL topology, and further therewith the various devices which are connected onto the fiber channel network constitute a computer system, operating with use of the SCSI mapping protocol. However, such the constitution also can be considered that the various devices are connected with use of the Fabric switches as shown in FIG. 3 so as to operate in the Fabric topology. Though the fiber channel network forms only one FC-AL loop in FIG. 1, by forming the fiber channel network with a plurality of FC-AL loops by use of the plural FC-AL hubs, as shown in FIG. 4, and further, by providing the fiber channel network between the host computer A (10) and the disk control units 30 and 40 being different from the fiber channel network between the disk control units 30 and 40 and the disk drive unit 20 in the loop thereof, there also can be considered a computer system in which the succession or taking over is necessary both in the fiber channel network between the host computer A (10) and the disk control units 30 and 40 and in the fiber channel network between the disk control units 30 and 40 and in the disk drive unit 20, when succeeding or taking over the logical unit control information.

The transfer of information on the fiber channel is performed by using information of signal level, being called by Order Set, as well as information having a fixed format, being called by a frame. A representative one of the Order Set includes SOF (Start Of Frame) for use in identification of the header of frame (frame header), EOF (Start Of Frame) for use in identification of the end of the frame, IDLE for indicating fact that no frame is transferred on the loop, LIP (Loop Initialization) for use in request of initialization of the FC-AL loop, etc.

Next, explanation will be given on the frame, as a basic unit for the fiber channel to perform the transfer of data. The frame can be classified broadly into a dataframe and a link control frame on the basis of functions thereof. The data frame is used for transferring information, and also installs the data which is used under the higher rank protocol, such as the SCSI, and command in a pay load portion of the data field.

On a while, the link control frame is used, in general, in order to indicate success or failure in the transfer of frames. It includes an ACK frame for indicating the receipt of frame, and a frame for noticing the parameter(s) relating the transfer when performing log-in operation.

Explanation will be given on the format of the frame by referring to FIG. 5. A frame 70 is constructed with the SOF 71, the frame header 72, the data field 73, CRC 74 and EOF 75.

The SOF (Start Of Frame) 71 is an identifier of four (4) bytes positioned at the top of the frame. The EOF (End Of Frame) 75 is an identifier of four (4) bytes attached at the end of the frame. And, each border defined between the frames is indicated by the SOF or the EOF.

The frame header 72 includes a frame type, a higher protocol type, and N_Port addresses of a sender and a receiver (or destination). Each of those N_Port addresses indicates an address on the host computers 10 and 50 and the disk control units 30 and 40 which are connected to the fiber channel network.

At the header portion of the data field 73 can be positioned a header of a higher rank layer, and it is followed by the pay load portion for carrying the data of themselves. The CRC (Cyclic Redundancy Check) 74 is a check code of four (4) bytes, being provided for the purpose of checking the data of the frame header and the data field.

Next, the format of frame is shown in FIG. 6. D_ID (Destination ID) 81 is the N_Port address of the receiver side of the frame, while S_ID (Source ID) 82 the N_Port address of the sender side of the frame. With the FC-AL topology, the lower eight (8) bits among the twenty-four (24) bits of the N_Port address indicate the address, and in particular, the N_Port address of the FC-AL is called as AL-PA (Arbitrated Loop Physical Address).

Next, explanation will be given on a FCP_CMND (Fiber Channel Protocol for SCSI Command), a portion of the pay load of the data field 73 constructing the frame, and on a FCP_RSP (Fiber Channel Protocol for SCSI Response).

A format of the FCP_CMND is shown in FIG. 7. In FCP_LUN (FCP Logical Unit Number) field is designated a logical unit which commands by the number thereof, while in FCP_CNTL (FCP Control) field is designated a command control parameter.

In FCP_CDB (FCP Command Descriptor Block) filed 93 is stored a SCSI CDB which is for use in transmission of the command at the SCSI interface, while in Operation Code 95 are stored the number(s) indicative of an Inquiry or command(s), such as Read, Write, Mode sense, Mode select, etc. Further, there are also stored the LUN, logical block addresses, lengths of transfer blocks, etc., together. In FCP_DL (FCP Data Length) 94, there is designated an amount of the data to be transferred with the present command by the byte number thereof. With the frame being constructed in this manner, the transfer of the SCSI commands is performed on the fiber channel network.

A format of the FCP_RSP is shown in FIG. 8. The FCP_RSP 100 is used for the purpose of reporting the result in operation of the SCSI command. In FCP_STATUS 101 are stored SCSI statuses, such as a Good status of reporting that the command is completed in normal, a Check Condition status of indicating that the command is completed in abnormal, and a Busy status of indicating that the device is in condition that it cannot accept the command from the host computer, etc.

Figure 9:
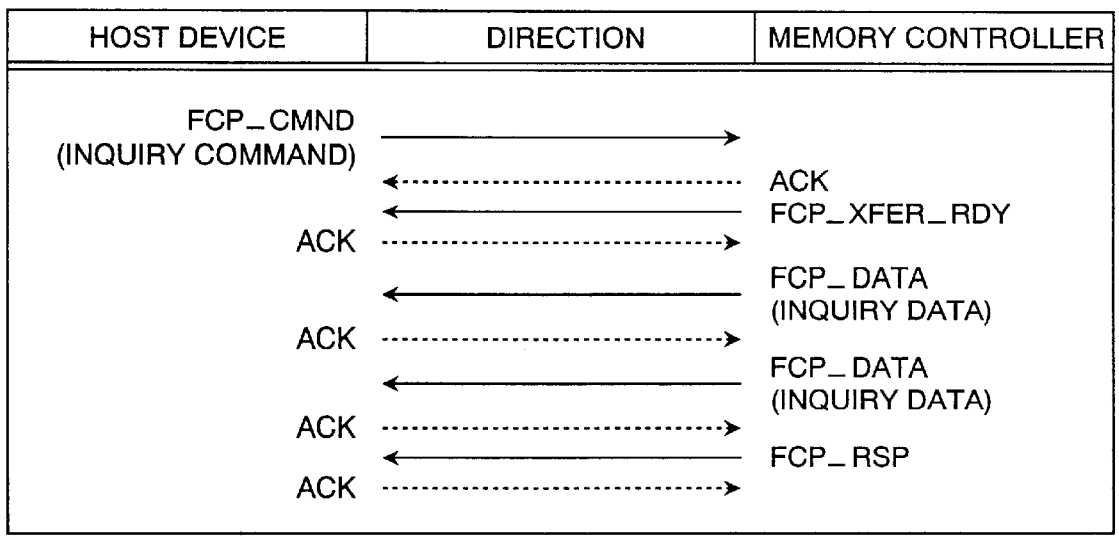
FIG. 9 is a view for showing sequences of an Inquiry command.

Next, explanation will be given on roles of commands in the FCP_CMND 90, such as Inquiry, Mode Sense, Mode Select, etc. In FIG. 9 is shown sequence of the Inquiry command. The Inquiry command is used for the host devices 10 and 50 to search information, such as, the device type of each one of the devices which are connected to the fiber channel network, the function(s) being supported thereby, the vender name of product, or the product name. Those information are stored into an Inquiry data, which is sent to the host computer 10 and 50 by the disk control units 30 and 40 receiving them.

Figure 10:
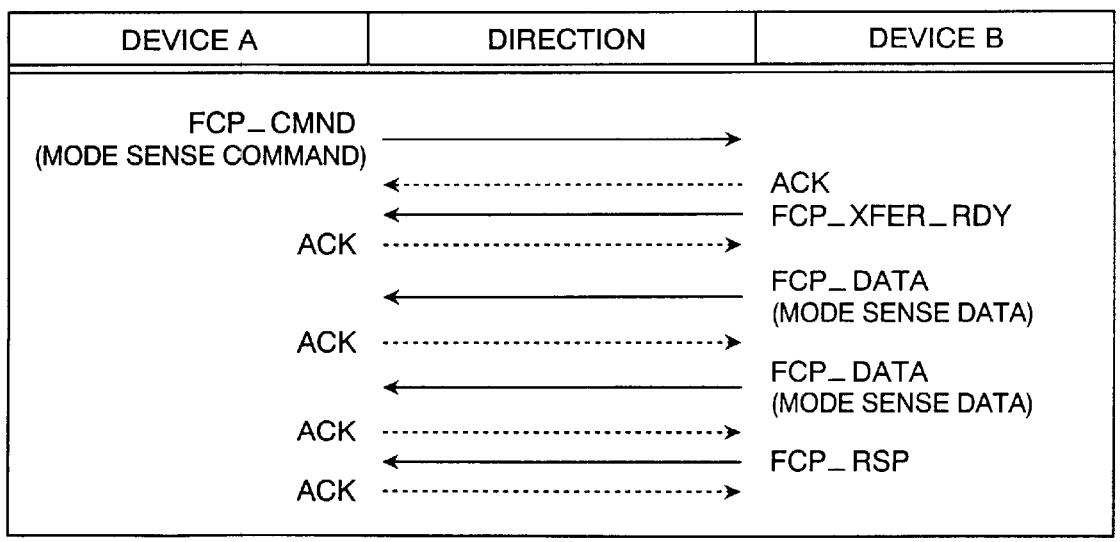
FIG. 10 is a view for showing sequences of a Mode Sense command.

In FIG. 10 is shown a sequence of the Mode Sense command. The Mode Sense command is used for the host computers 10 and 50 to refer the parameter of each of the devices being connected to the fiber channel network. As pages which can be referred by the Mode Sense command, there are includes a plurality of fixed pages and vender unique pages, and each page to be referred can be designated by a Page Code. Those information are stored in the Mode Sense data, which is sent by the disk control unit receiving the Mode Sense command.

Figure 11:
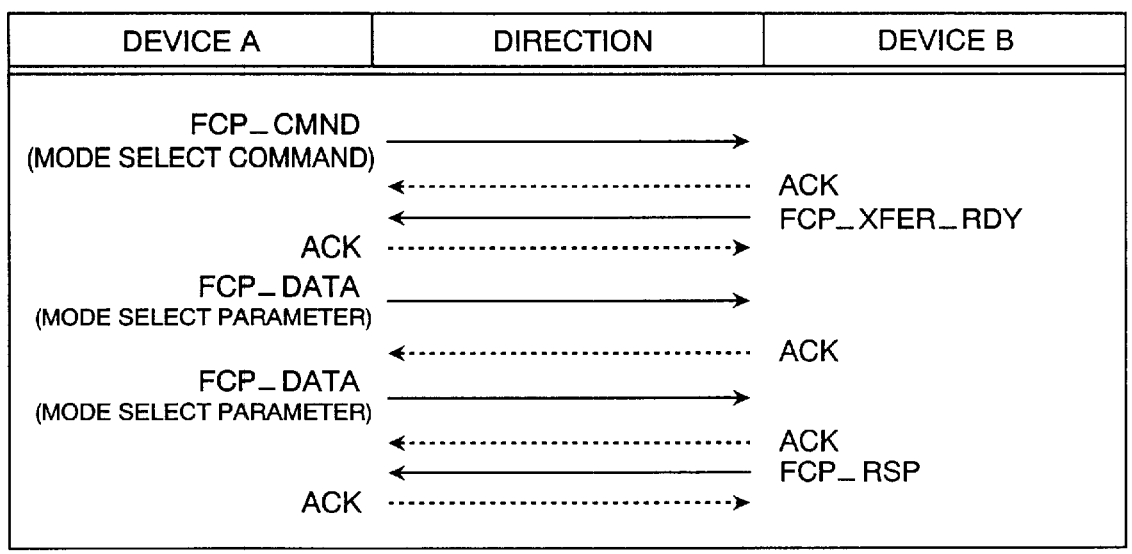
FIG. 11 is a view for showing sequences of a Mode Select command.

While, the Mode Select command shown in FIG. 11 is the command for use in changing or altering the parameter(s) which can be referred by the Mode Sense command mentioned above. For changing the parameter, it is enough that the page(s) to be changed is designated by the Page Code so as to send a Mode Select parameter list to the disk control unit.

Next, explanation will be given on the control memory 32 which stores the information being necessary when performing the succession or taking over of the logical unit between the disk control units. The control memory 32 is made of the non-volatile memory, therefore the information stored can be maintained permanently, even if interruption occurs in the electric power source abruptly.

In the control memory 32, other than the micro-program for controlling the operations of the disk control units 30 and 40, there are stored a physical disk drive control table 110 and a logical unit control table 120. A format of the physical disk drive control table is shown in FIG. 12. In the physical disk drive control table 110, the physical disk drive number 111 is the number which is assigned to the magnetic disk drive within the disk drive unit uniquely. A physical disk drive position 112 stores the logical address indicating that magnetic disk drive therein. A memory capacity 113 and a number of blocks 114 store therein the total memory capacity and the total block number of that magnetic disk drive, and also a RAID group number 115 stores the number of the RAID groups to which that magnetic disk belongs. Further, a condition 116 stores therein an information of indicating whether that magnetic disk drive is in an on-line condition under which it can be used, or in a blocking condition under which it cannot be used. Furthermore, a kind 117 of memory device is used for identifying the memory device on the fiber channel network 60, i.e., the magnetic disk device, the optical disk device, the opt-magnetic disk device, the magnetic tape device or various kinds of library devices.

A format of the logical unit control table is shown in FIG. 13. In the logical unit control table 120, the logical unit number 121 is the number, which is assigned to the logical unit within the disk drive unit, uniquely. A RAID group number is the RAID group number to which that logical unit belongs, and a RAID level 123 is the RAID level thereof. A header address 124 and an end address 125 are the header logical block address and the end logical block address, respectively, which are used for the purpose of indicating the position on the RAID group of that logical unit. Information of the physical disk drive control table 110 within the above-mentioned control memory 32 and of the logical unit control table 120 can be referred by the Mode Sense command which is issued by other device(s), and are changeable in the parameters thereof by the Mode Selection command.

Figure 14:
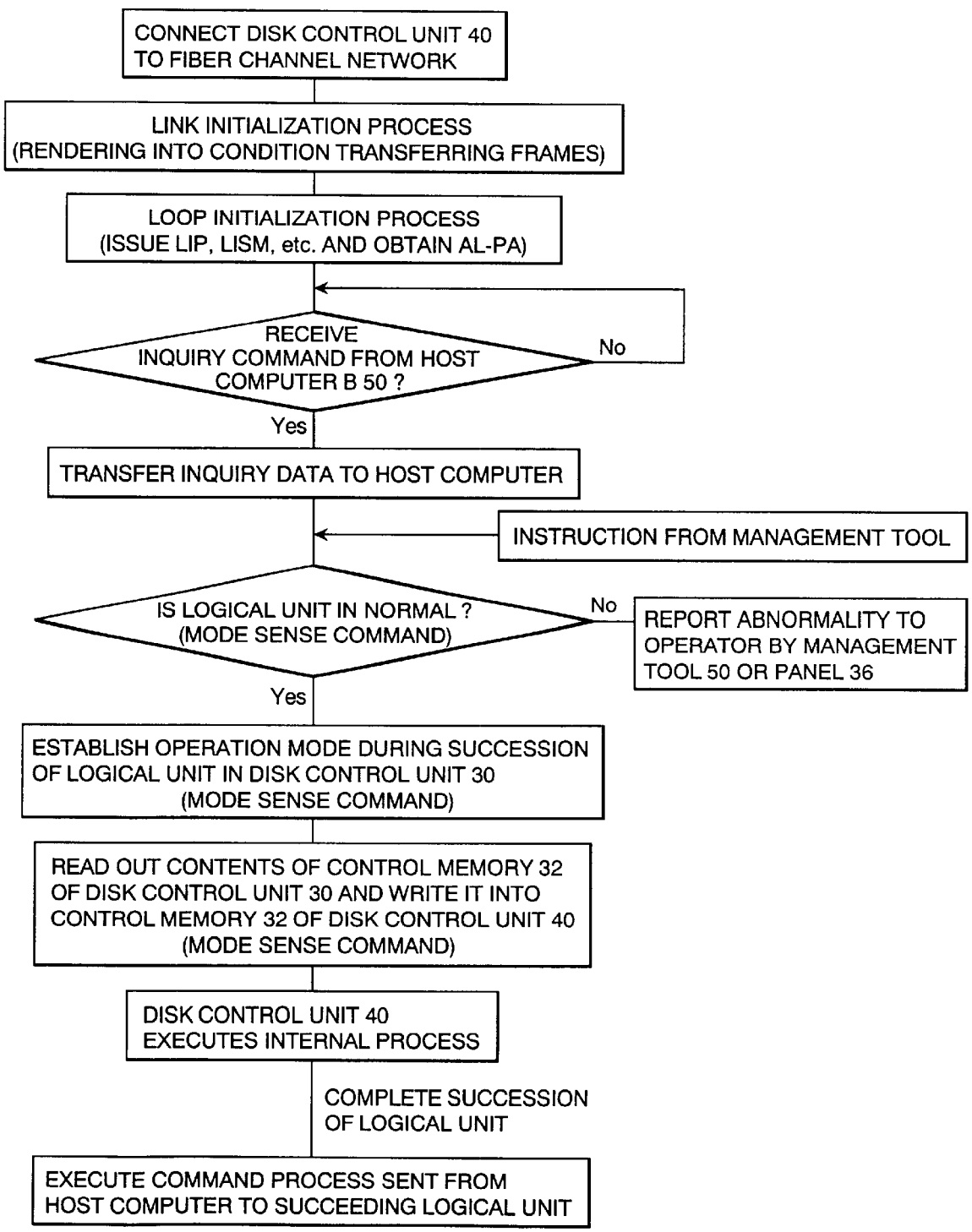
FIG. 14 is a flow chart for showing operation sequences of the disk control unit which is newly added to the fiber channel network in the present embodiment.
Figures 15, 16:
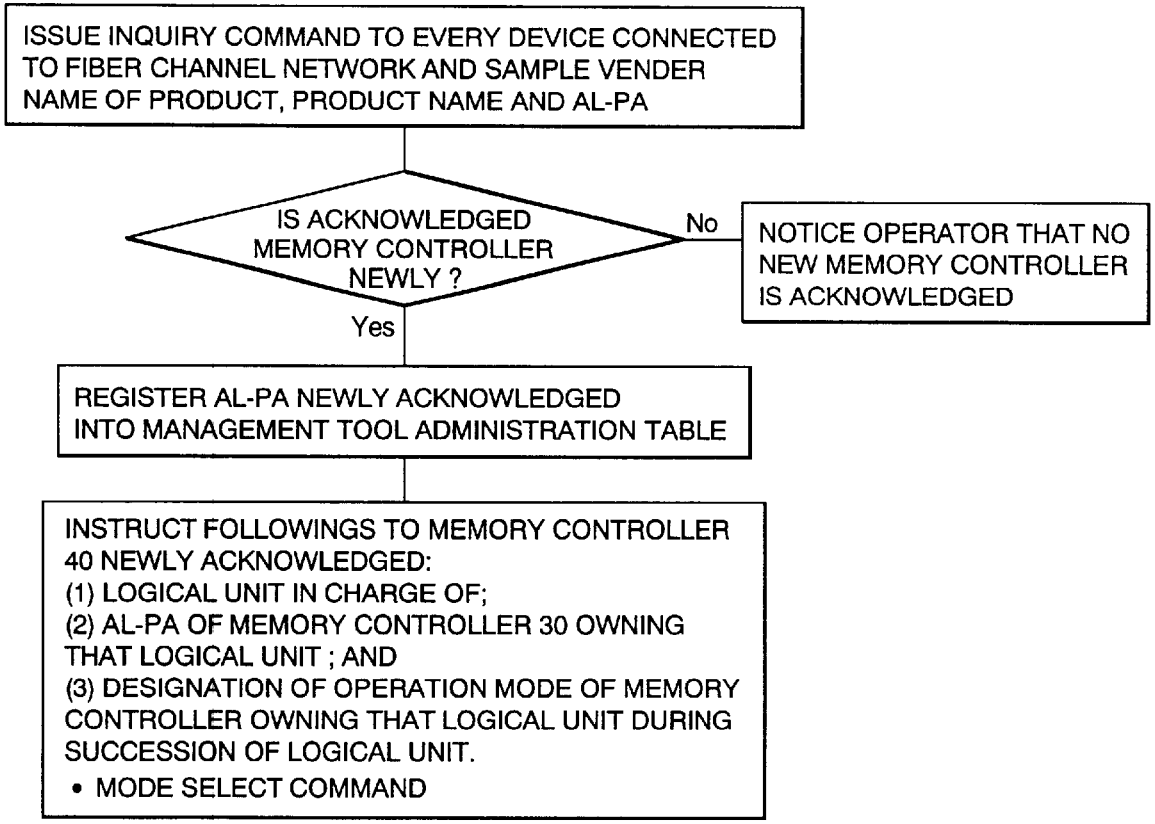
FIG. 15 is a flow chart for showing the operation sequences of a management tool which is installed in a host computer in the present embodiment.
FIG. 16 is a view for showing a format of a management tool administration table, into which is stored administration information of the management tool installed in the host computer in the present embodiment.

Next, steps will be shown for processing addition of a new disk control unit 40 to the fiber channel network 60 during the on-line operation and for succession of the logical unit. This processing steps can be divided into operation sequences of the disk control unit 40 and the operation sequences of manager tool installed in the host computer B (50), broadly. In FIG. 14 is shown the operation sequences of the disk control unit 40, and in FIG. 15 the operation sequences of the management tool installed in the host computer B (50), respectively.

First, explanation will be given on the steps of adding the disk control unit 40 onto the fiber channel network 60 and of setting or deciding the AL-PA. After connecting the FC-AL hub constructing the fiber channel network 60 with the disk control unit 40 to be newly added through a fiber channel cable, then the electric power source of the disk control unit 40 to be newly added is turned ON. Upon turning ON of the electric power source, the disk control unit 40 executes the processes for link initialization, thereby turning it into the condition so that the frames can be transferred on the fiber channel network 60.

Next, the disk control unit 40 which is newly added executes the processes for loop initialization. The disk control unit 40, which is newly added onto the fiber channel network having the FC-AL topology therein, does not have the AL-PA being effective when the electric power source is turned ON. Then, the disk control unit 40 being newly added executes the loop initialization processes, thereby being assigned with the effective AL-PA. The disk control unit 40 to which the AL-PA is determined stops the processing once so as to wait for an instruction from the management tool which is installed in the host computer B (50).

Next, explanation will be given on the management tool mentioned above. The management tool mentioned above owns a management tool administration table 130 shown in FIG. 16, in a file form. In the above-mentioned management tool administration table 130 are stored the information of the AL-PA 131 of the disk control unit 30 connected onto the fiber channel network 60 and the LUN 132 in charge thereof.

The above-mentioned management tool issues one kind of the FPC_CMND 90, i.e., the Inquiry command to all of the devices which are connected onto the fiber channel network 60, so as to obtain the AL-PA of the disk control unit 40 being newly added. And, it investigates the vender name of product and the product name thereof, which are stored in the response thereto, i.e., in the response to the Inquiry data, and further finds out the device(s) which is not registered on the management tool administration table 130 by referring to the AL-PA at the frame sender side. Thereby, it is possible to identify the AL-PA of the disk control unit 40 being newly added, and the AL-PA is newly written into the management tool administration table 130.

When once is identified the AL-PA of the disk control unit 40 which is newly added, the management tool instructs to the disk control unit 40, the logical unit to be conducted the succession thereon, the AL-PA of the disk control unit 30 which has been in charge of that logical unit, and the operation mode during the succession of the logical unit of the disk control unit 30 which has been in charge of that logical unit.

The role(s) of the management tool mentioned in the above can be also achieved by using the disk control unit 40 and a panel which is installed in the disk control unit 40. In this instance, an operator inputs the logical unit onto which she/he wishes to succeed or take over the disk control unit 40 by using a panel 36, so that it finds out the disk control unit being in charge of that logical unit by using the Inquiry command. And, it is enough to memorize the AL-PA of the disk control unit 30 which owns the logical unit to be succeeded. Also, the logical unit which performs the succession, and the operation mode during the succession of the logical unit of the disk control unit 30 which has been in charge of that logical unit are input by the operator.

Next, the disk control unit 40, in which the logical unit is determined to perform the succession, enters into processes for succeeding the logical unit. First of all, the disk control unit 40 issues the one kind of the FCP_CMND, i.e., the Mode Sense command to the disk control unit 30, so as to investigate the condition of that logical unit. If the condition of that logical unit is in normal, the disk control unit 40 enters into the processes for succeeding the logical unit, while if the logical unit is in the blocking condition under which the logical unit cannot be used, this fact is noticed to the operator through the host computer B (50) having the management tool, or through the panel 36.

Next, explanation will be given on a method for setting or establishing the operation mode during the succession of the logical unit of the disk control unit which has been in charge of that logical unit. This is performed by issuing the one kind of the FCP-CMND, i.e., the Mode Select command, by means of the disk control unit 40, thereby performing changes in the settings of the disk control unit 30. Thereafter, responding to the request for process which is issued by the host computer to the disk control unit 30 during the succession of the logical unit, the disk control unit 30 returns the Busy status in the FCP_REP 100. Here, in case where the Busy status is responded continuously to the request for the command process from the host computer, there is possibility that the request for the command process is in a time-out condition, therefore the process for the succession of the logical unit is performed within a time period within a such range that it does not fall in the time-out condition.

Next, if there is remained a command (a cueing command) which was received from the host computer but has not yet been processed, then the disk control unit 30 executes that command to that logical unit, and further writes all the Write data to the logical unit which are remained on that cache memory into the disk drive unit 20. Thereby, even in a case where the device in charge of the logical unit is shifted from the disk control unit 30 to the disk control unit 40, the data within the disk drive unit 20 is guaranteed, in particular in the compatibility thereof.

Next, the disk control unit 40 makes copy of the contents of the control memory 32, in which are stored the physical drive control table 110 and the logical unit control table 120, being necessary when succeeding that logical unit from the disk control unit 30 to the disk control unit 40. The copy of the control memory 32 is realized by operations that the disk control unit 40 issues the one kind of the FCP_OMND 90, i.e., the Mode Sense command to the disk control unit 30, and that the information of the control memory 32 of the disk control unit 30 is read out so that the contents thereof is written into the control memory 32 of the disk control unit 40.

When receiving the information of the physical disk drive control table 11 and the logical unit control table 120 which are necessary for the succession of the logical unit, the disk control unit 40 executes internal processes to be in a condition of enabling the command processes, thereby preparing for the request of the command processes. From the host computer 10 the processes can be performed with continuity, by changing the route of access of the logical unit from the disk control unit 30 which has been existing before to the disk control unit 40 which is newly added to.

Further, as a method for succeeding the control information of the logical unit between the above-mentioned disk control units 30 and 40, the disk control unit existing on the fiber channel network succeeds or takes over the control information by a unit of the logical unit from other disk control unit which is connected to the same fiber channel network during the on-line operation of the computer system, and thereafter it is in charge of the request for command processes issued to that logical unit from the host computer. This is applicable to load distribution between or among the disk control units existing on the fiber channel network, and also to a means for unifying several processes which are performed by the plurality of the disk control units into an arbitrary disk control unit.

Figure 17:
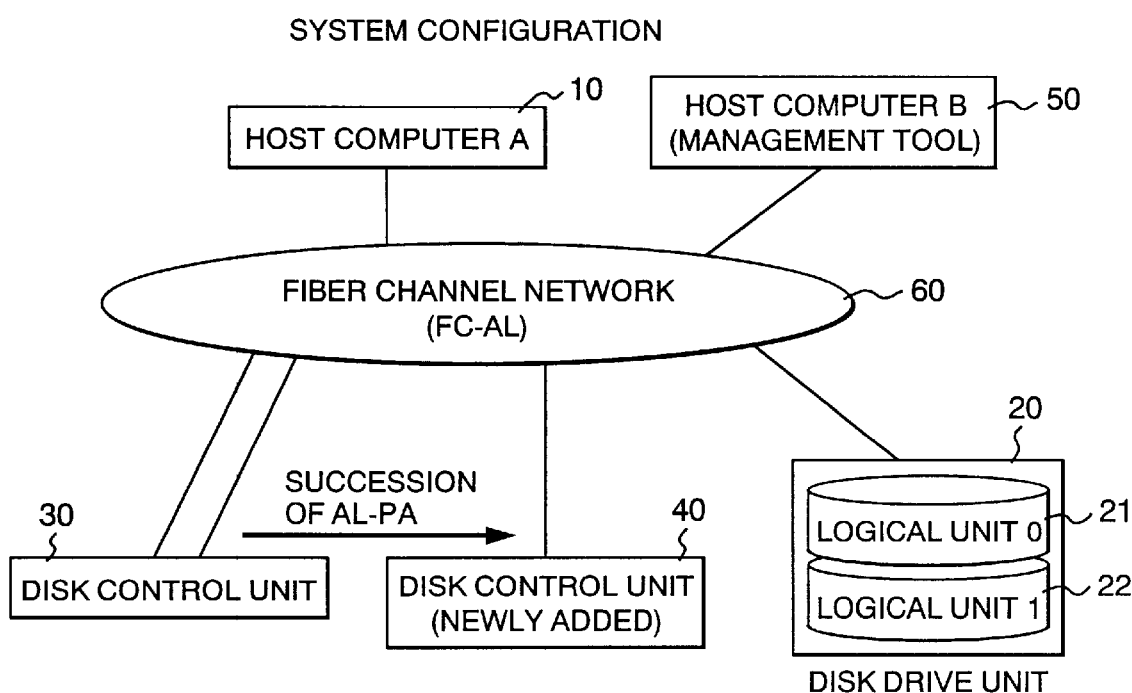
FIG. 17 is a constructive view of a data storage system achieving unnecessary of change in access route from the host computer, after completing succession of the logical unit between the disk control units, in the present embodiment.

Next, explanation will be given on a method, in which no change is necessitated in the access route from the host computer by the operator, when the charge of the logical unit is shifted from the disk control unit 30 to the disk control unit 40. As is shown in FIG. 17, the disk control unit installs the fiber channel adapters of the same number to the logical units which were in charge, and in each of them is established the AL-PA. The AL-PA in each is administrated as a pair together with the logical unit being in charge of. When the charge of the logical unit is shifted from the disk control unit 30 to the disk control unit 40, not only the control information of the logical unit, but also the AL-PA is succeeded. Thereby, since it is not acknowledged from the host computer that the charge of the logical unit is shifted from the disk control unit 30 to the disk control unit 40, it is possible to issue the request of processes in the same manner as before in the succession of that logical unit, thereby rendering the change in the access route unnecessary.

In this manner, with application of the present invention, it is possible to perform the load distribution between or among the disk control units by adding the disk control unit 40 to the fiber channel network 60 during the on-line operation. Further, in accordance with the same method, it is also possible to change the logical units of which the plural disk control units on the fiber channel network are in charge, freely, thereby achieving the load distribution and integration between or among the existing disk control units.

As is fully explained in the above, according to the present invention, in the fiber channel network having the existing disk control unit(s) which is connected thereto, it is possible to achieve the load distribution and the integration of processes between or among the disk control units, by adding a new memory controller(s) thereto during the on-line operation so as to succeed the charge of processes of the logical unit(s) thereof, thereby obtaining an increase of the processing capacity of the data storage system as a whole.

In more details, when the existing disk control unit(s) which is connected to the fiber channel network being standardized by the ANSI X3T11 falls into a condition of shortage in processing capacity thereof, a new disk control unit(s) can be added to the computer system during the on-line operation thereof, thereby obtaining the load distribution.

Further, according to the present invention, at the maximum, 127 sets of the devices can be connected with the FC-AL (Fiber Channel Arbitrated Loop) topology, and bout 1,700 sets of the devices with the Fabric topology, and by applying as an interface a fiber channel which has a feature that it can be logged-in into the fiber channel network automatically by connecting the device(s) physically to the fiber channel network during the on-line operation, so as to issue the link reset from the device side, it is possible to add, not only two sets of the disk control units, but also the plurality sets of the disk control units therein, during the on-line operation, thereby enabling expansion of the data storage system with flexibility, without troubling by the initial settings thereof.

What is claimed are:

1. A method for a data storage system, having one or more of memory device(s), a host device, and a memory controller for controlling transfer of data stored in said memory device(s) responding to an instruction from said host device, the memory controller being connected to an interface for use in connection with said host device in a route which stands between said memory device(s) and said host device logically and connects to said host device logically, comprising:

adding a new memory controller into said data storage system during on-line operation thereof in addition to said memory controller which is provided previously;

turning on an electric power source of said new memory controller; and identifying said new memory controller by either one of a tool being operative on said host device and said memory controller, thereby sharing processing capability with said previously provided memory controller and said newly added memory controller.

2. A method for treating a data storage system as described in the claim 1, wherein there comprises a step for executing an initialization process of said route in place of the step of turning on said electric power source of said new memory controller.

3. A method for treating a data storage system as described in the claim 1, wherein said memory controller has a function of storing control information of a logical unit of said memory device(s), and further comprising a step of starting storage of the control information of said logical unit.

4. A method for treating a data storage system as described in the claim 1, wherein said memory device(s) comprises at least one from a magnetic disk device, an optical disk device, an opt-magnetic disk device, a magnetic tape device and a library device.

5. A method for a data storage system, having one or more of memory device(s), a host device, and a memory controller for controlling transfer of data stored in said memory device(s) responding to an instruction from said host device, the memory controller being connected to an interface for use in connection with said host device in a route which has been standing in advance between said memory device(s) and said host device logically and connects to said host device and said memory controller logically, comprising:

adding a new memory controller into said data storage system during on-line operation thereof;

executing an initialization process of said route; and obtaining information for said host computer to identify the memory controller having been standing in advance, uniquely, by said new memory controller, the new memory controller, thereby sharing processing capability with said memory controller having been standing in advance.

6. A method for treating a data storage system as described in the claim 5, wherein said memory controller has a function of storing control information of a logical unit of said memory device(s), and further comprising a step of starting storage of the control information of said logical unit.

7. A method for treating a data storage system as described in the claim 5, wherein said memory device comprises at least one from a magnetic disk device, an optical disk device, an opt-magnetic disk device, a magnetic tape device and a library device.

8. A memory controller, the memory controller being connectable to a data storage system during an on-line operation, the data storage system including a host device, a storage means including one or more memory device, and a second memory controller, the memory controller capable of being added into logically standing between said host device and said storage means and comprising:

connection means connectable to an interface used for connection with said host device in a route being logically connected to said host device;

an internal memory for storing control information of a logical unit of said memory device(s) which is stored in said second memory controller already standing between said host device and said storage means; and means for controlling transfer of data stored in said memory device(s) depending upon an instruction from said host device, wherein the memory controller is identified by either one of a tool being operative on said host device and said second memory controller, the memory controller thereby sharing processing capability with said second memory controller.

9. The memory controller according to claim 8, wherein said memory controller is connected to said interface used for connection with said one or more memory device in said route logically connecting between said memory device(s) and to said second memory controller.

10. The memory controller according to claim 8, wherein said route is a fiber channel which is standardized by ANSI X3T11.

11. The memory controller according to claim 8, wherein said internal memory holds information for use in controlling the logical unit of said one or more memory device until said internal memory is reset.

12. The memory controller according to claim 8, wherein said one or more memory device comprises at least one of a magnetic disc device, an optical disc device, an opto-magnetic disc device, a magnetic tape device, and a library device.

* * * * *